United States Patent [19]

Watanabe

[11] Patent Number: 4,751,863
[45] Date of Patent: Jun. 21, 1988

[54] SUPPLY APPARATUS FOR SUPPLYING SCREWS OR THE LIKE

[75] Inventor: Choji Watanabe, Saitama, Japan

[73] Assignee: Sony Corporation, Tokyo, Japan

[21] Appl. No.: 22,814

[22] Filed: Mar. 6, 1987

[30] Foreign Application Priority Data

Mar. 7, 1986 [JP] Japan .................................. 61-50222

[51] Int. Cl.[4] ............................................. B25B 23/04
[52] U.S. Cl. ..................................... 81/432; 81/57.37; 81/433
[58] Field of Search ...................... 81/432, 57.37, 430, 81/433; 227/2; 221/165, 162, 168, 180, 183, 184, 202; 222/547, 564; 414/288

[56] References Cited

U.S. PATENT DOCUMENTS 1,462,629  7/1923  Whitaker et al. ................... 221/180
3,021,882  2/1962  Knoll et al. .......................... 81/432

Primary Examiner—Frederick R. Schmidt
Assistant Examiner—Lawrence Cruz
Attorney, Agent, or Firm—Hill, Van Santen, Steadman & Simpson

[57] ABSTRACT

A supply aparatus for supplying screws, rivets, or the like includes a chute for supplying screws or the like to a predetermined position, a detecting means for detecting that one of screws or the like has been taken out from the predetermined position, and a vibrating means for vibrating the chute. When the detecting means detects that one of the screws, or the like, has been taken out from the predetermined position, the vibrating means temporarily vibrates the chute, so that the following screws or the like can be smoothly supplied to the predetermined position.

7 Claims, 9 Drawing Sheets

SUPPLY APPARATUS FOR SUPPLYING SCREWS OR THE LIKE

BACKGROUND OF THE INVENTION

1. Field of the Invention

The present invention relates to a supply apparatus for supplying screws or the like each having a shaft and a head portion whose diameter is larger than the shaft (e.g., screw, rivet, or the like; collectively referred to as screws hereinafter), to a predetermined position and, more particularly, relates to a screw supply apparatus having a chute for supplying screws to a predetermined position via a guide slit.

2. Description of the Prior Art

Prior to this application, the present applicant proposed in Japanese Utility Model application No. 60-131054 filed on Aug. 28, 1985 a novel and unique device relating to a screw supply apparatus for supplying screws or the like to a predetermined position through a chute.

According to the device of this prior application, screws charged into a screw storage section are dipped up by a dipper that can oscillate vertically, and the dipped screws are supplied to a predetermined screw supply section through a chute. A guide slit opens on the upper surface of the chute. When screws are supplied to the chute from the dipper, they are supplied to the screw supply section by their weight such that their shafts are inserted in the guide slit and their head portions are engaged with side edge portions of the upper opening of the guide slit.

With this device of the prior application, however, when moisture or dirt exists on the upper surface of the chute, the flow of screws is prevented. In particular, when light-weight screws each having a diameter smaller than 1.4 mm and a length smaller than 3 mm are supplied with the above method using natural dropping of the screws by their own weight, moisture or dirt on the upper surface of the chute greatly affects the flow of the screws on the chute. If the screw flow on the chute is prevented, the screws are not smoothly supplied to the screw supply section, and an operation for mounting screws becomes very inefficient.

In order to eliminate the above drawback, a method is proposed wherein the chute is continuously vibrated by an electromagnet or the like, thereby allowing a smooth flow of screws on the chute. When the chute is continuously vibrated, however, a screw cannot be easily taken out from the screw supply section of the chute. More particularly, when screws are taken out from the screw supply section by attracting their head portions magnetically with a magnetic screwdriver, a screw attracted by the magnetic screwdriver can be dropped unexpectedly therefrom by the above noted vibration, and the screw removal operation becomes difficult.

OBJECTS AND SUMMARY OF THE INVENTION

It is therefore an object of the present invention to provide a screw supply apparatus which can smoothly supply screws to a predetermined position without being prevented by moisture or dirt on the upper surface of the chute and which is suitable as an apparatus for supplying light screws that can easily be affected by moisture or dirt on the chute.

It is another object of the present invention to provide a screw supply apparatus wherein, even when a screw is attracted magnetically by a magnetic screwdriver and removed from a predetermined position, droppage of the screw attracted by the magnetic screwdriver is prevented.

It is still another object of the present invention to provide a screw supply apparatus wherein noise generated upon vibration of the chute, and discomfort imposed on an operator thereby, can be minimized and the service life of a drive source, such as a motor, required for vibrating the chute can be prolonged.

The above, and other objects, features and advantages of the invention will be apparent from the following detailed description which is to be read in conjunction with the accompanying drawings.

DETAILED DESCRIPTION OF THE PREFERRED EMBODIMENTS

Figure 1:
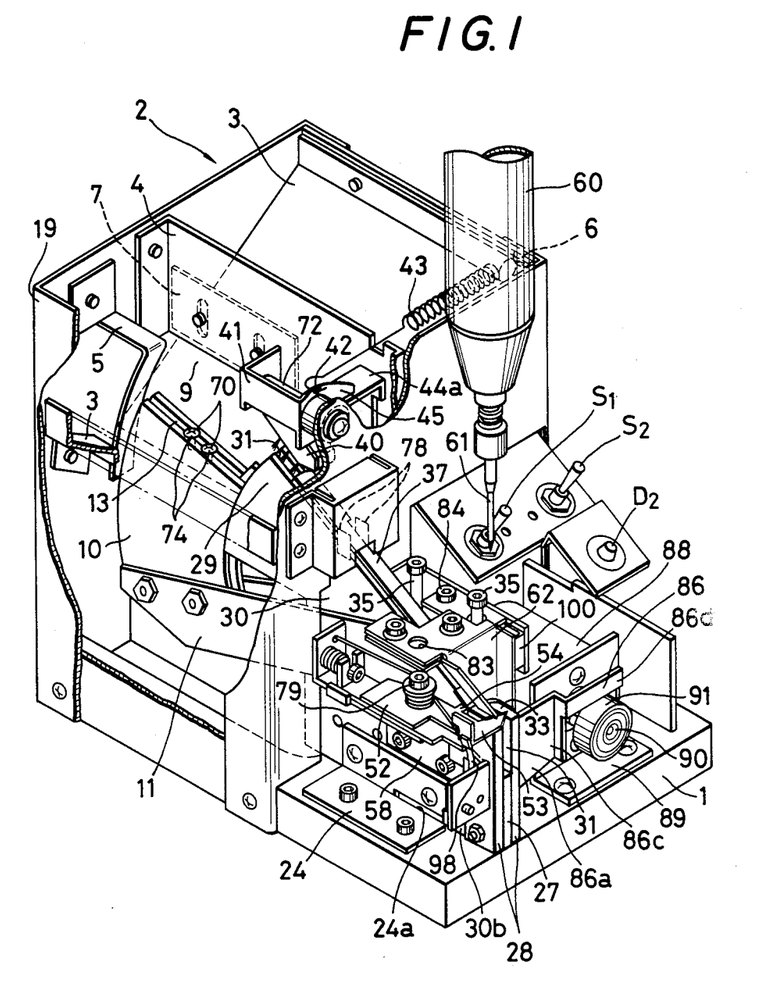
FIG. 1 is a perspective view of a screw supply apparatus according to an embodiment of the present invention.
Figure 2:
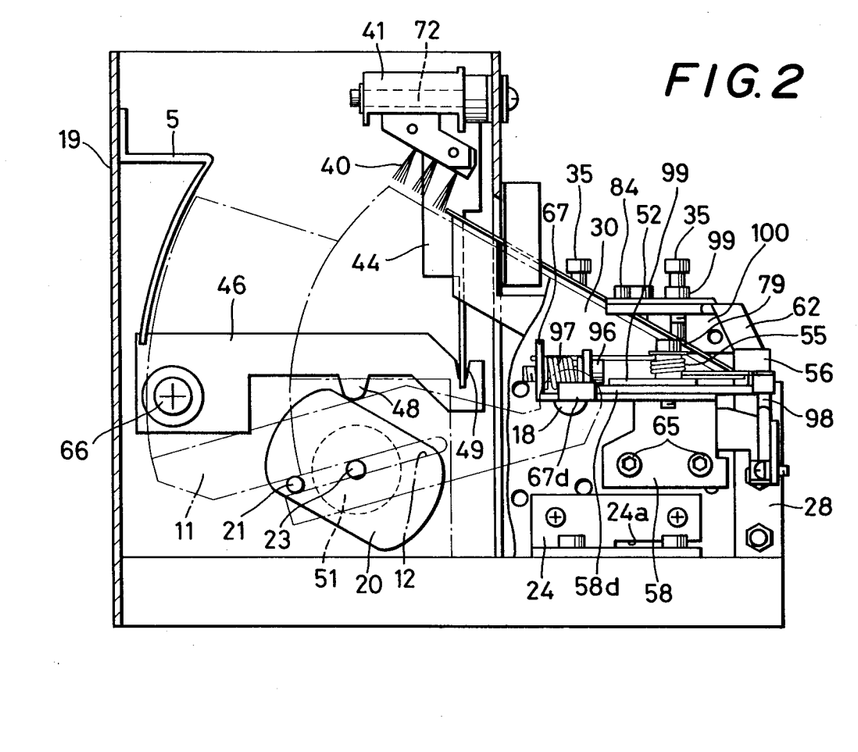
FIG. 2 is a partially cutaway cross-sectional view of the apparatus shown in FIG. 1.

As shown in FIG. 1, a frame 19, which has a substantially rectangular parallelepiped shape, extends from an upper portion of a base 1. A dipper 10 for dipping up screws is arranged in a lower portion of the frame 19. Note that the dipper 10 includes a guide slit 13 to engage with the shaft of each screw 70 to be supplied, and an arm 11. The proximal end of the arm 11 is axially supported by a chute 30 to be pivotal about a shaft 18, as shown in FIG. 2, thereby vertically oscillating the dipper 10. An engaging slit 12 for engaging pin 21, which is eccentrically provided on the side surface of a rotating cam 20, is formed in the arm 11 along the longitudinal direction thereof and oscillates the arm 11 when the cam 20 rotates.

A plurality of inclined plates 3 are arranged in the frame 19, as shown in FIG. 1. These inclined plates 3 and the frame 19 constitute a stock, or supply section 2 for stocking screws 70. A partition plate 4 is arranged at substantially the central position of the stock section 2. A communication opening 9 is formed at a lower portion in the partition plate 4. An interval adjusting plate 7 for adjusting the vertical dimensions of the communication opening 9 is mounted on the partition plate 4. The screws 70 stocked in the stock section 2 are guided along the inclined plates 3 and are gathered toward the upper opening of the guide slit 13 through the communication opening 9.

A screw intrusion-guard member 5 is arranged at a side end face, i.e., an inner side face of the frame 19 to face the dipper 10. Note that, when the dipper 10 moves downward, the screw intrusion-guard member 5 prevents the screws 70 from being engaged between the inner side face of the frame 19 and the trailing edge of the dipper 10 to interfere with the movement of the dipper 10.

The chute 30 is arranged in front of the dipper 10 on the base 1. The chute 30 comprises a pair of flat guide plates 29, and has a guide slit 31 which can communicate with the guide slit 13, between the guide plates 29, of the dipper 10. A rear half of the chute 30 on the leading end side is arranged inside the stock section 2, and the front half thereof on the trailing end side is arranged outside the section 2. The upper surface of the chute 30 is inclined downward from its rear end to its front end. When the dipper 10 is at its uppermost position, the upper surfaces of the dipper 10 and chute 30 form a substantially continuous inclined surface (in the drawings, they are indicated by a substantially straight line). Therefore, in this state, the upper openings of the guide slits 13 and 31 form a substantially continuous groove.

A brush member 40 for removing screws of abnormal position (e.g., a screw turned sideways) on the upper surface of the chute 30 is arranged above the leading end of the upper surface of the chute 30. The brush member 40 is mounted on a substantially U-shaped brush mounting plate 41. The brush mounting plate 41 is axially supported by a shaft 72 on the frame 19, so as to oscillate in a direction substantially perpendicular to the upper opening of the guide slit 31 of the chute 30. A mounting hole 42 is formed in the brush mounting plate 41, and a biasing means (e.g., a coil spring) 43 is engaged between the mounting hole 42 and a mounting portion 6 formed on the side wall of the stock section 2.

A drive motor 51 is arranged in the frame 19, as shown in FIG. 2. The rotating cam 20 is fixed to a rotating shaft 23 of the motor 51. A follower portion 48 projecting downward from an intermediate portion of a tracer member 46 abuts against the cam surface of the rotating cam 20. One end of the follower member 46 is axially supported by a shaft 66 to be pivotal with respect to the frame 19. An engaging notch 49 is formed in the other end of the follower member 46, and is engaged with the lower end of an arm 44. Note that the projection 45 of the brush mounting plate 41 is urged against an actuating portion 44a of the arm 44, as shown in FIG. 1.

The eccentric pin 21 projects from the side surface of the rotating cam 20, as previously described, and is engaged with the engaging slit 12 formed in the arm 11 of the dipper 10. Therefore, the dipper 10 reciprocates once around the shaft 18 upon a single rotation of the rotating cam 20.

The chute 30 has a pair of holding plates 28, as shown in FIG. 1, which are thicker than the guide plates 29. The holding plates 28 are arranged adjacent to the front end side of the guide plates 29. Since these holding plates 28 and the guide plates 29 have a spacer 27 in common, the guide slit 31 extends to the front ends of the holding plates 28. The holding plates 28 are coupled to the spacer 27 by screws 85, as shown in FIG. 4.

Figure 4:
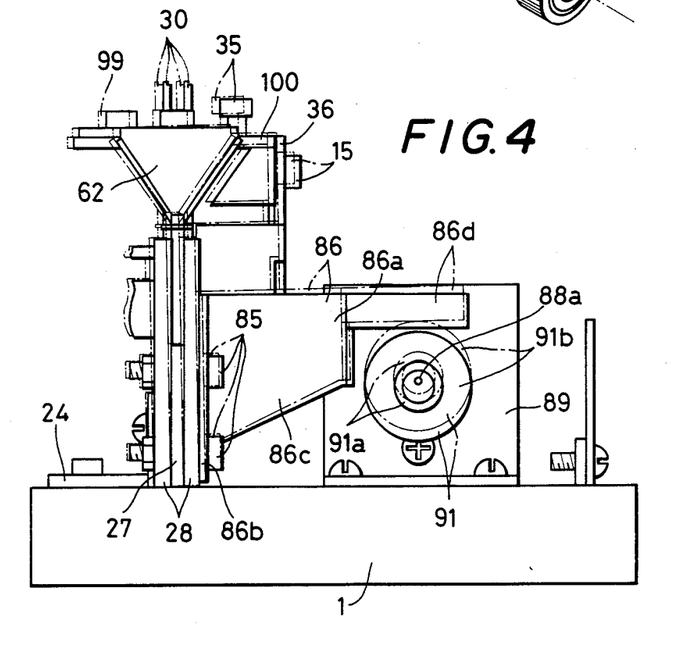
FIG. 4 is a front view of the chute and a vibration applying unit of the apparatus shown in FIG. 1 for explaining the vibrating operation of the chute.

An arm member 86 is arranged on a side portion of the chute 30, as shown in FIGS. 1 and 4. The arm member 86 consists of an arm portion 86a projecting horizontally with respect to a side portion of the chute 30 and a mounting portion 86b substantially perpendicular to the arm portion 86a. Since the mounting portion 86b is fastened by the screw 85 described above, which fixes the holding plate 28, it is fixed to the chute 30. Note that since the screw hole (not shown) of the mounting portion 86b through which the screw 85 extends is a vertically elongated hole, the screw 85 can be adjusted by vertically moving the mounting position of the arm member 86. The arm portion 86a is tapered from its proximal portion 86c close to the mounting portion 86b toward its distal end portion 86d. The distal end portion 86d has a thin (in horizontal direction), substantially rectangular shape.

Figure 6:
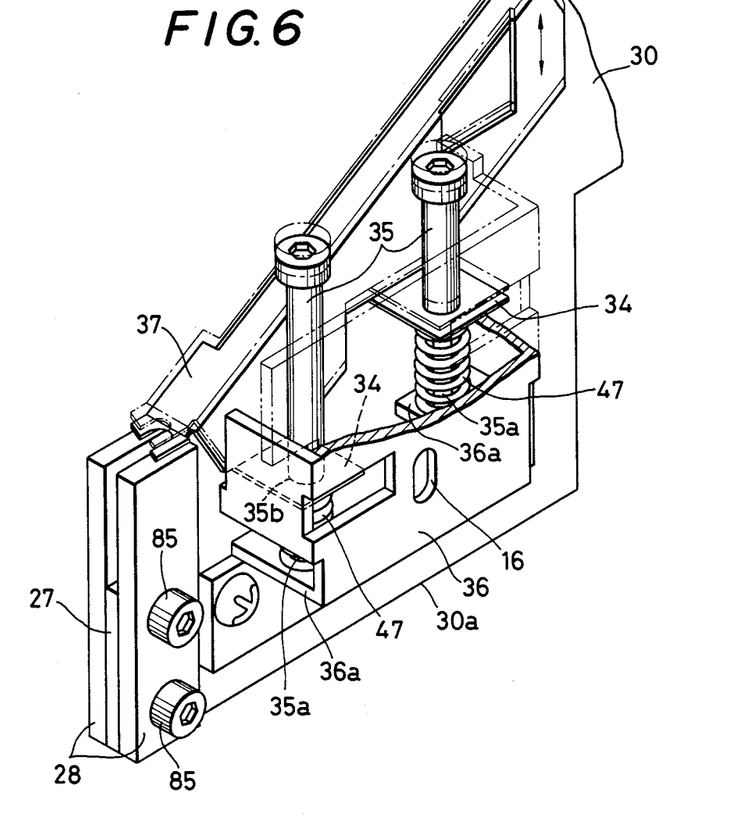
FIG. 6 is a perspective view of a cover member adjusting mechanism of the chute of the apparatus shown in FIG. 1.

A cover member 37 is arranged on the upper surface of the chute 30, excluding its rear end portion, as shown in FIGS. 1 and 6. The cover member 37 prevents a head portion 74 of each screw 70 from floating from the upper surface of the chute 30 and assuming in abnormal position thereon. The distance between the cover member 37 and the upper surface of the chute 30 is substantially identical with the height of the head portion 74 of the screw 70, but is slightly larger than that. The cover member 37 is vertically movable so that the distance between itself and the upper surface of the chute 30 can be adjusted in accordance with the size of the head portion 74 of a supplied screw 70. More specifically, a pair of vertically-shifted horizontal plate portions 34 are formed on the side portion of the cover member 37, as shown in FIG. 6, and hexagon socket head cap screws 35 are fitted in the holes (not shown) of the respective horizontal plate portions 34. A screw portion 35a at the distal end of each screw 35 is screwed into a screw hole (not shown) formed on a bottom plate 36a of a holder member 36 fastened at the side portion of the chute 30. A step portion 35b is formed at an intermediate portion of the screw 35. Coil springs 47 are arranged between the horizontal plate portions 34 of the cover member 37 and the bottom plate 36a of the holder member 36 as they receive the screws 35. The springs 47 bias the cover member 37 upward.

When the screws 35 are fastened, the horizontal plate sections 34 of the cover member 37 are urged downward by the step portions 35b and the cover member 37 is moved downward against the springs 47. When the screws 35 are loosened, the cover member 37 is moved upward by the biasing force of the springs 47. In this embodiment, the front and rear end sides of the cover member 37 can be separately, vertically moved to adjust the distance between the cover member 37 and the upper surface of the chute 30 to various values. As a result, the distance can be adjusted depending on various screws having different screw lengths. For example, when long screws that can be set vertically by their own weight and inclined with respect to the upper surface of the chute 30 are to be supplied, the front end side of the cover member 37 is moved upward so that the head portions of the screws can be effectively prevented from being engaged with the front end portion of the cover member 37. When short screws that can fall sideways near the end of the chute 30 are to be supplied, adjustment can be made such that the rear end side of the cover member 37 is moved downward so that the screws are prevented from falling sideways.

A photosensor 78 consisting of light-emitting and light-receiving elements is arranged on the side of the chute 30, as shown in FIG. 1. These light-emitting and light-receiving elements are indicated as a light-emitting diode D1 and a phototransistor Q1 in FIG. 10. The photosensor 78 detects presence/absence of a screw 70 near the leading end of the upper surface of the chute 30. When the photosensor 78 detects that only a few screws 70 are left on the chute 30, the dipper 10 oscillates in accordance with this detection result to supply more screws 70 to the chute 10. When a certain amount of screws 70 remain on the chute 30, the oscillation of the dipper 10 stops.

Figure 5:
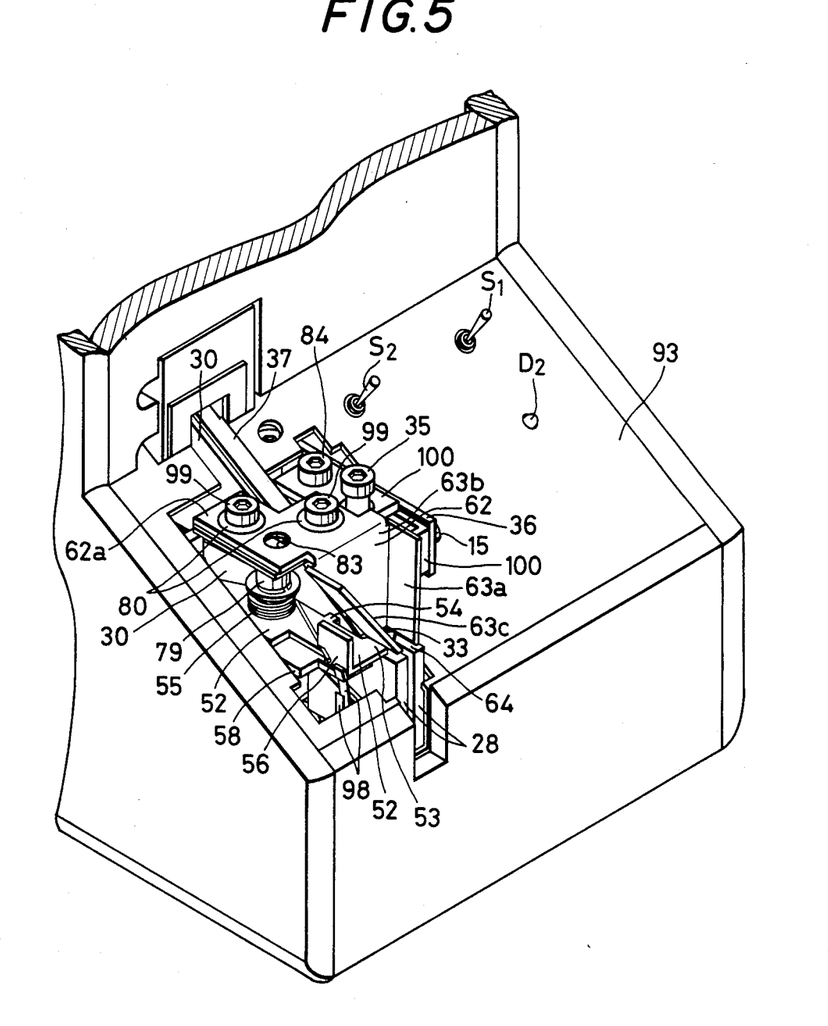
FIG. 5 is a partially enlarged perspective view of the screw supply section with its periphery of the apparatus shown in FIG. 1.
Figure 8:
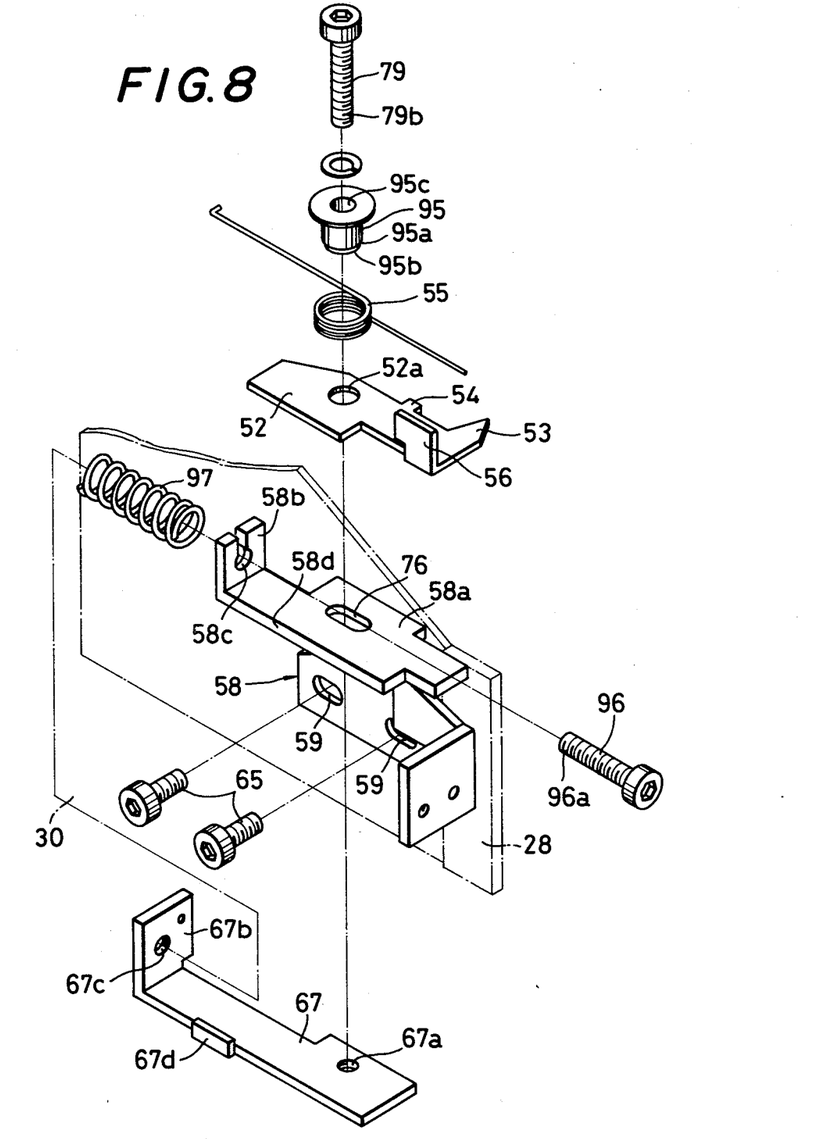
FIG. 8 is a perspective exploded view of an engaging member adjusting mechanism of the apparatus shown in FIG. 1.

An engaging member 52 is arranged near a screw supply section 33 at the trailing end of the upper surface of the chute 30, as shown in FIGS. 1 and 5. This engaging member 52 is pivotally mounted on a table 58, which is fixed by screws to be adjacent to the chute 30. Note that a pair of elongated holes 59 are formed to be elongated along the front-rear direction of the table 58, as shown in FIG. 8, and the chute 30 is fixed to the table 58 by screws 65 inserted in the elongated holes 59. Therefore, the position of the table 58 can be adjusted along the front-rear direction of the chute 30.

The engaging member 52 is arranged to oppose a slide member 67 with an upper plate 58a of the table 58 sandwiched therebetween, as shown in FIG. 8. The engaging member 52 and the slide member 67 are coupled to each other by a screw 79 inserted in an elongated hole 76 of the upper plate 58a. A collar 95 is used for this coupling. A step portion 95a of the collar 95 is arranged on the upper surface of the engaging member 52, and a lower end portion 95b thereof abuts against the upper surface of the table 58 through a hole 52a in the engaging member 52 at the periphery of the elongated hole 76 of the table 58. Since the length between the step portion 95a of the collar 95 and the distal end of the lower end portion 95b thereof is constant and is slightly larger than the thickness of the engaging member 52, the engaging member 52 is prevented from being brought into tight contact and fixed with the upper plate 58a of the table 58, and the engaging member 52 is thus slidable on the upper plate 58a. When the screw 79 is inserted in a hole 95c of the collar 95 and a screw portion 79b of the screw 79 is screwed into a screw hole 67a of the slide member 67, the engaging member 52 and the slide member 67 are coupled through the screw 79.

A through hole 58c is formed on a vertical wall portion 58b on the rear end of the upper plate 58a of the table 58. The through hole 58c corresponds to a screw hole 67c formed in a vertical wall portion 67b on the rear end of the slide member 67. A slide screw 96 is inserted in the through hole 58c, and a screw portion 96a of the slide screw 96 is screwed into the screw hole 67c of the slide member 67. A spring 97 is arranged between the vertical wall portion 58a of the table 58 and the vertical wall portion 67b of the slide member 67 as it receives the slide spring 96.

Figure 9:
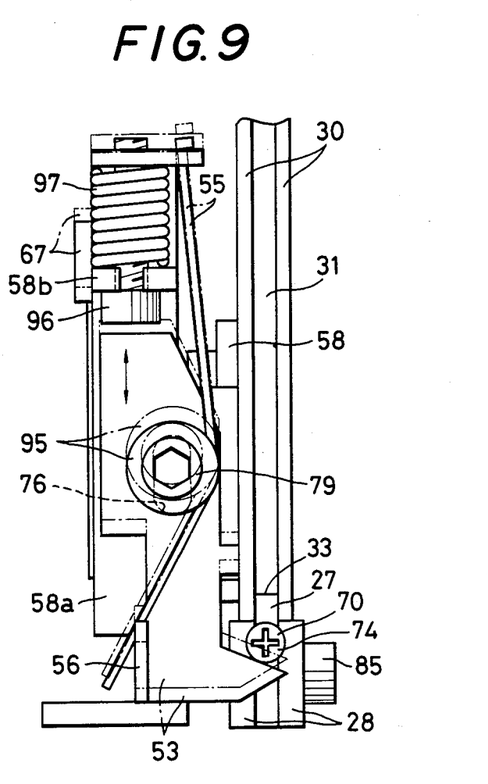
FIG. 9 is a partial plan view for explaining the operation of the engaging member of the apparatus shown in FIG. 1.

A coil spring 55 is wound around the collar 95. The engaging member 52 is biased counterclockwise (FIG. 9) by the coil spring 55. A V-shaped engaging portion 53 extending in a direction substantially perpendicular to the longitudinal direction of the engaging member 52 is formed in one end of the engaging member 52, as shown in FIG. 8. When the engaging member 52 is at a reverse pivoting position shown in FIG. 9, the engaging portion 53 causes the head portion 74 of the screw 70, which is guided along the upper opening of the guide slit 31 on the upper surface of the chute 30, to stop at the screw supply section 33. A stopper portion 54 is formed on the engaging member 52 to be adjacent to the engaging portion 53. The stopper portion 54 abuts against the side wall surface of the chute 30 to regulate the inactive position of the engaging member 52.

A projection 56 is provided on the engaging member 52 so as to engage with one end of the coil spring 55. A leaf switch 98 for detecting that a screw 70 is removed from the screw supply section 33, is arranged on the side of the projection 56, as shown in FIGS. 1 and 5. When the engaging member 52 is pivoted clockwise and moved to the active position shown in FIG. 9, in order to permit removal of a screw 70 from the screw supply section 33 in a direction along guide slit 31, the leaf switch 98 is actuated by the projection 56 of the engaging member 52 and is thus turned on. When the central position of a screw 70 with respect to the U-shaped notch of the bit guide 62 must be adjusted along the front-rear direction in accordance with the diameter of the head portion 74 of the screw 70, the screw 79 may be loosened and thereafter a slide screw 96 may be tightened or loosened. More specifically, when the slide screw 96 is tightened, the slide member 67 is moved from the alternate long and short dash line to the solid line in FIG. 9 against a spring 97. When the slide screw 96 is loosened, the slide member 67 is moved to the long and short dash line by a reverse operation to the above operation by the biasing force of the spring 97. Along with these movements, since the engaging member 52 coupled to the slide member 67 through the screw 79 moves along the guide slit 31 as well, the stop position of the screw 70 can be adjusted. It must be noted that a guide projection 67d is formed on one side end of the slide member 67. When the slide member 67 moves along the front-rear direction of the table 58, the projection 67d slides along one side surface 58d of the table 58, and the slide member 67 is thus moved as it is correctly guided.

Figure 7:
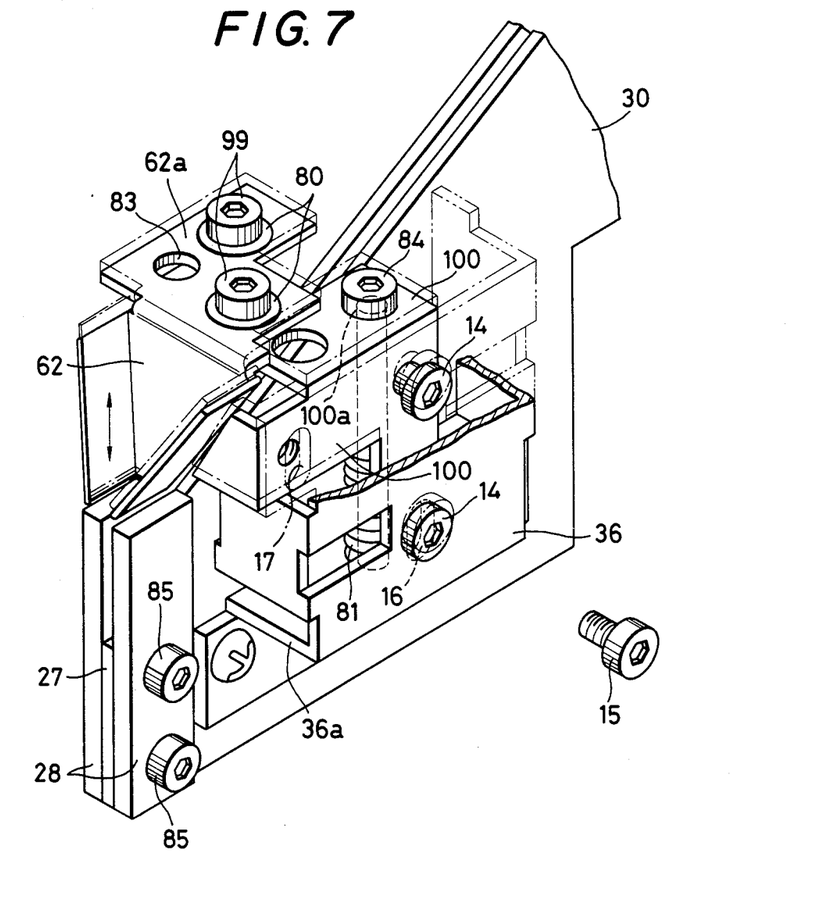
FIG. 7 is a perspective view of a screwdrive guide of the apparatus shown in FIG. 1.

A screwdriver, or tool bit guide 62 is arranged above the engaging portion 53 of the engaging member 52, as shown in FIGS. 1, 5 and 7. The bit guide 62 has three inclined surfaces 63a, 63b and 63c which are inclined and spread upward from the head portion 74 of the frontmost screw 70 stopped by the engaging member 52. The lower ends of these inclined surfaces define the U-shaped notch 64 having substantially the same width as a diameter of the head portion 74 of the screw 70. As shown in FIG. 7, an upper end portion 62a of the bit guide 62 is horizontal, and the bit guide 62 is fixed to a vertically movable elevating member 100 by a screw 99, which is inserted in a hole (not shown) formed on the upper end portion 62a, and by a washer 80. The hole (not shown) in the bit guide 62 that receives the screw 99 has a diameter larger than the diameter of the screw 99 so that the position of the bit guide 62 can be adjustable in any horizontal direction. A hole 83 is formed on the upper end portion of the bit guide 62. The hole 83 receives a bit 61 of a screwdriver 60 for clamping and loosening the screw 79 for the engaging member 52 located under it, as shown in FIG. 1.

The elevating member 100 to which the bit guide 62 is provided is fixed to the holder member 36, as shown in FIG. 7, by a stationary screw 15 inserted in an elongated hole 17 formed in the holder member 36. The elevating member 100 is vertically movable as needed with respect to the holder member 36. More specifically, when the elevating member 100 is to be vertically moved, the stationary screw 15 is first loosened, and thereafter a screw 84, which is inserted in a hole 100a formed in the upper portion of the elevating member 100 and screwed to the bottom plate 36a of the holder member 36, is fastened or loosened. The elevating member 100 is moved downward against a spring 81 when the screw 84 is fastened, and is moved upward by the biasing force of the spring 81 when the screw 84 is loosened. Upon the vertical movement of the elevating member 100, the vertical position of the bit guide 62 mounted on it is adjusted. A pair of guide pins 14 are provided on the side portion of the elevating member 100 and inserted in a pair of vertical guide holes 16 formed in the side portion of the holder member 36. The elevating member 100 is vertically, correctly guided by the pins 14 and the guide holes 16.

Figure 3:
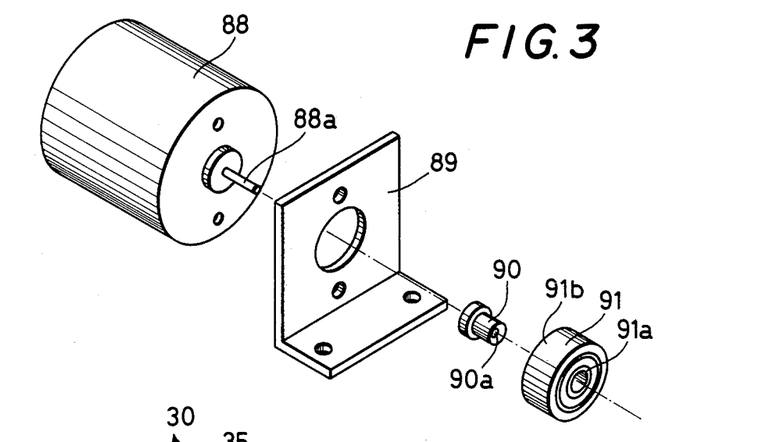
FIG. 3 is a perspective exploded view of a vibration generator for vibrating the chute of the apparatus shown in FIG. 1.

A motor 88 is arranged under the arm portion 86a projecting from the side portion of the chute 30, as shown in FIG. 4. The motor 88 is fixed to the base 1 by a mounting plate 89. An eccentric member 90 is fitted on the motor shaft 88a of the motor 88, as shown in FIG. 3, and is fitted in an inner ring 91a of a bearing 91. A motor shaft fitting hole 90a of the eccentric member 90 is eccentric with respect to its center, and the bearing 91 engaging therewith consists of the inner ring 91a which rotates along with the rotation of the eccentric member 90, and an outer ring 91b opposing thereto through a ball (not shown). The bearing 91 is arranged immediately under the distal end portion 86d of the arm portion 86a, as shown in FIG. 1.

When the motor 88 is driven, the eccentric member 91 is fitted on the motor shaft 88a is rotated, and the inner ring 91a of the bearing 91 is rotated. Since the eccentric member 90 is eccentric with respect to the motor shaft 88a, the centers of the eccentric member 90 and the bearing 91 fitted on it trace circular tracks as they rotate. In this case, the vertical mounting position of the arm portion 86a with respect to the bearing 91 is adjusted such that when the bearing 91 is at its lowermost position, its outer ring 91b separates from the arm portion 86a and comes in contact with the arm portion 86a at an intermediate position from the lowermost to an uppermost position. Thus, as shown in FIG. 4, since the outer ring 91b of the bearing 91 repeatedly abuts against the distal end of the arm member 86 from below and beats it, the arm member 86 is repeatedly vibrated. In the case of the screw supply apparatus of this embodiment, a pulse impact of about 4,200 pulses per minute is given to the arm member 86. When the arm portion 86a is repeatedly beaten by the bearing 91, the chute 30 to which the arm member 86 is fixed is vibrated.

It must be noted that the chute 30 is fixed to the base 1 by a fixing plate 24, as shown in FIG. 1. The fixing plate 24 has a substantial L-shaped section, and a slit 24a is formed in its bent portion. The slit 24a facilitates the vibration of the chute 30 along the right-left direction. The fixing plate 24 is arranged on the side portion of the chute 30 opposite to the arm member 86. Therefore, when the arm portion 86a of the arm member 86 is beaten to be moved upward by the bearing 91, as will be described later, one lower end 30a of the chute 30 on the mounting side of the arm member 86 floats while its other end 30b as the fulcrum of the vibration of the chute 30 is firmly fixed.

In this manner, when an impact like vibration is given to the chute 30 with a small amplitude, even if moisture or dirt is present on the upper surface of the chute 30, the screws 70 on the upper surface of the chute 30 can be smoothly supplied to the screw supply section 33 without being interfered with thereby.

When the motor 88 is driven, only the inner ring 91a of the bearing 91 rotates and its outer ring 91b abuts against the arm portion 86a without substantially rotating since a ball (not shown) is present between the outer and inner rings 91b and 91a. Therefore, abrasion is small compared to a case wherein the outer ring 91b contacts the arm portion 86a as it rotates.

The motor 88 is switched to various states of continuous operation, intermittent operation, and off by a switch S2 arranged on a side of a power switch S1 shown in FIG. 1. The motor 88 is switched to continuous operation when screws 70 are to be continuously supplied to the chute 30 having no screws 70, as in the case of starting the screw supply apparatus. The motor 88 is switched to intermittent operation when the motor 88 is to be driven for a short time (about one second) every time a screw 70 is taken out from the screw supply section 33. The motor 88 is switched completely off by the switch S2 when screws 70 smoothly flow on the chute 30.

The operation of this embodiment will be described as follows.

Figure 10:
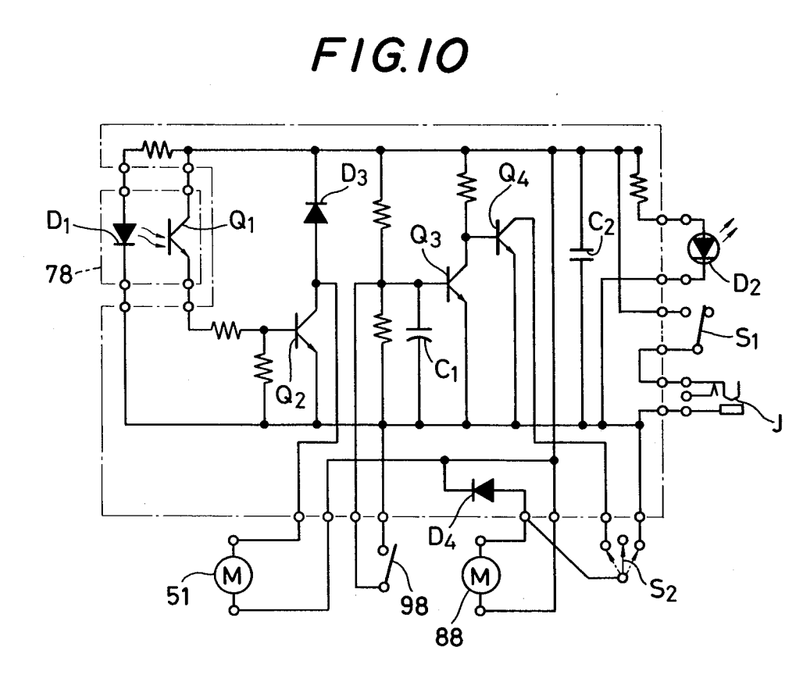
FIG. 10 is an electrical circuit diagram of the appratus shown in FIG. 1.

FIG. 10 is an electrical circuit diagram of this screw supply appparatus. When a power source plug is connected to a jack J and the power switch S1 is turned on, the photosensor 78 is operated to detect presence/absence of a screw 70 on the chute 30. More specifically, when the screws on the chute 30 are few or no screw is present on the chute 30, the light from the light-emitting diode D1 constituting the photosensor 78 is received by the phototransistor Q1, and the phototransistor Q1 is turned on. Thus, a transistor Q2 is turned on and the drive motor 51 for driving the dipper 10 is started.

When the cam 20 shown in FIG. 2 is rotated by the motor 51, the eccentric pin 21, engaged with the engaging slit 12 formed in the arm 11 of the dipper 10, slides within the slit 12 and oscillates the dipper 10 vertically. Upon movement of the dipper 10, the screws 70, whose shafts 71 are inserted in the guide slit 13 of the dipper 10, are dipped up by the dipper 10. When the arm 44 is pushed upward by the follower member 46 upon rotation of the cam 20, the actuating portion 44a of the arm 44 pushes the projection 45 of the brush mounting plate 41. Therefore, the brush member 40 swings in a direction substantially perpendicular to the upper opening of the guide slit 31 of the chute 30, and the screws 70 of abnormal position are removed.

When the upper surface of the dipper 10 is aligned with that of the chute 30 and the upper openings of the slits 13 and 31 thereof communicate with each other, the screws 70 dipped up by the dipper 10 slide downward along the chute 30 by their own weight, their shaft portions 71 being inserted in the slit 31, and are supplied to the screw supply section 33. The screw which has slid down along the chute 30 is engaged with and stopped by the engaging portion 53 of the engaging member 52 at the head portion 74 thereof. When a certain amount of screws 70 are ranged on the chute 30, the photosensor 78 detects it since the light from the light-emitting diode D1 is no longer received by the phototransistor Q1 and the phototransistor Q1 is turned off.

Therefore, the transistor Q2 is turned off, and the drive motor 51 is thus stopped.

Therefore, when the bit 61 of the magnetic screwdriver 60 is moved downward along the inclined surface 63b, 63a or 63c of the bit guide 62, the distal end of the bit 61 automatically abuts against the head portion 74 of the screw 70, and becomes attached thereto by its attraction force. In this state, when the bit 61 is pulled forward along the U-shaped notch 64, since the head portion 74 of the screw 70 pushes the engaging member 52, the engaging member 52 pivots clockwise (FIG. 9) around a screw 79. As a result, the screw 70 is drawn out from the screw supply section 33. Note that after the screw 70 is drawn out, the engaging member 52 quickly returns to the position indicated by the solid line in FIG. 9 by the biasing force of the coil spring 55, thereby preventing unnecessary release of the following screws. In this case, since the stopper portion 54 formed on the engaging member 52 strikes the side wall surface of the chute 30 to apply an impact thereto, screw flow on the upper surface of the chute 30 can be smooth. Particularly, since small screws are light in weight, their flow is often prevented on the chute 30. In such a case, it is effective to apply an impact to the chute 30. When the engaging member 52 returns to its original positon, since the stopper portion 54 abuts against the side wall surface of the chute 30, the engaging member 52 can be prevented from being excessively pivoted. Thus, the engaging portion 53 can be returned to a predetermined position on the chute 30.

On the other hand, when the motor 88 is to be driven to vibrate the chute 30 by the bearing 91 through the arm member 86 so as to allow smoother flow of the screws on the chute 30, the switch S2 may be switched from the off position to continuous or intermittent operation position. More specifically, when the switch S2 is switched from the off position indicated by the solid line to the continuous operation position indicated by the dotted line in FIG. 10, the motor 88 for vibrating the chute 30 is started and is continuously driven. Therefore, the chute 30 is continuously vibrated in the manner as described above.

When the switch S2 is switched to the intermittent operation position indicated by an alternate long and short dash line, the chute 30 is vibrated for a short time every time a screw 70 is taken out from the screw supply section 33 as described above. More particularly, when a screw is taken out from the screw supply section 33, the leaf switch 98 is turned on by the engaging member 52, and a capacitor C1 is thus discharged. A transistor Q3 which has been on is turned off, a transistor Q4 which has been off is turned on, and the motor 88 is thus started. While the motor 88 is driven, the chute 30 is vibrated, as described above.

When a screw is taken out from the screw supply section 33, since the engaging member 52 is returned, the leaf switch 98 is turned off again, and the capacitor C1 is charged again. When a predetermined period required for charging elapses, the transistors Q3 and Q4 are turned on and off again, respectively, and the motor 88 is thus stopped. With this arrangement, every time a screw is taken out from the screw supply section 33, the motor 88 is driven for a predetermined period of time (about one second), and the chute 30 is temporarily vibrated.

Referring to FIG. 10, reference symbol D2 denotes a power source lamp; D3 and D4, counter electromotive force preventive diodes; and C2, a noise preventive capacitor.

Note that the screw supply apparatus described above is preferably used for supplying small screws each having a diameter of 1.4 to 1.7 mm and a length of 1.4 to 10 mm, but can be used for supplying screws each having a diameter smaller than 1.2 mm or larger than 2.0 mm and a length smaller than 1.4 mm or larger than 10 mm. According to the above embodiment, the adjustment of the vertical position of the cover member 37 of the chute 30 and the bit guide 62, and the adjustment of the position of the engaging member 52 along the front-rear direction can be easily performed by the screws 35 and 84 and the slide screw 96. Since these screws are arranged at positions easily accessible from outside, as shown in FIG. 5, the cover 93 of the apparatus and so on need not be removed for their adjustment.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

In the above embodiment, the vibrating means for vibrating the chute comprises the arm member 86 for vibrating the chute and the motor 88 having eccentric rotating members 90 and 91 that intermittently beat the arm member. However, the vibrating means can comprise an arm member 86 and a rod which is vertically oscillated to beat it.

In the above embodiment, the outer ring 91b of the bearing 91 of the motor 88 is intermittently brought into contact with the arm member 86 to vibrate the chute 30. However, the outer ring 91b may constantly contact with the arm member 86 upon rotation of the motor 88, and the arm member 86 may thus be vertically oscillated to vibrate the chute 30.

Furthermore, in the above embodiment, the detecting means for detecting that a screw has been taken out from a predetermined position comprises the leaf switch 98 which is an electrical switch. However, the detecting means can comprise a photosensor.

I claim as my invention:
1. A supply apparatus for supplying screws or the like which comprises:
   a reservoir section for stocking screws or the like;
   a dipper arranged to pick up the screws or the like in said stock section;
   an inclined chute for supplying the screws or the like picked up by said dipper to a predetermined position;
   a guide slit which is open to an upper surface of said chute to guide the screws or the like, such that shafts of the screws or the like are received therein and head portions of the screws or the like are supported on an upper surface of said chute;
   detecting means for detecting that one of the screws or the like has been removed from the predetermined position; and
   vibrating means for vibrating said chute,
   wherein when said detecting means detects that one of the screws or the like has been removed from the predetermined positon, said vibrating means temporarily vibrates said chute, and the following screws or the like are smoothly supplied to the predetermined position.

2. An apparatus according to claim 1, wherein said vibrating means comprises an arm projecting from a side portion of said chute and beating means for intermittently beating said arm to give an intermittent impact thereto.

3. An apparatus according to claim 1, wherein said vibrating means comprises an arm projecting from a side portion of said chute and a vibration generator having and eccentric rotating member for beating said arm.

4. An apparatus according to claim 1, further comprising an engaging member which moves between an inactive position for engaging with head portions of the screws or the like which have been guided by said guide slit and stopping the screws or the like at the predetermined position, and an active position for allowing removal of screws or the like from the predetermined position in a direction along said guide slit, and wherein said engaging member operates said detecting means.

5. The apparatus set forth in claim 4 wherein said detecting means comprises an electrical switch which in turn energizes said vibrating means.

6. Apparatus set forth in claim 1 wherein said chute is fixedly mounted on a base member and said vibrating means and said predetermined position are closer to said base than said chute whereby said chute vibrates at a greater amplitude than said predetermined position.

7. Apparatus set forth in claim 1 including detecting means sensing the absence of screws on said chute and means responsive thereto to operate said dipper.

* * * * *